Sept. 6, 1966  E. K. HENRIKSEN  3,270,556
EXPLOSIVELY ACTUATED TENSILE TESTING DEVICE
Filed Oct. 10, 1963

INVENTOR.
ERIK K. HENRIKSEN
BY *Edward O. Ansell*

ATTORNEY

United States Patent Office 3,270,556
Patented Sept. 6, 1966

3,270,556
EXPLOSIVELY ACTUATED TENSILE
TESTING DEVICE
Erik K. Henriksen, Downey, Calif., assignor to Aerojet-General Corporation, Azusa, Calif., a corporation of Ohio
Filed Oct. 10, 1963, Ser. No. 315,142
7 Claims. (Cl. 73—95)

The present invention relates to tensile testing and more particularly to a novel method and device for performing tensile tests on a specimen at high rates of strain in which a controlled explosive charge is utilized.

The use of explosive forming techniques in producing aerospace vehicle components has made it necessary to ascertain the physical properties of materials which have been explosively formed. Such information is essential in order to determine the maximum strength, and the minimum weight for a desired strength of components may be explosive forming techniques. Also needed is information on the formability of specific materials at strain rates to which they may be exposed.

In determining the action of explosive forming on metals and metal structures and the formability of metals used, a system is required which will provide means for testing samples of the material under the prescribed strain rates among other conditions experienced in the use of explosive forming techniques.

Prior attempts to test materials under conditions approximating those encountered in explosive forming have not succeeded in properly simulating the conditions which occur. Heretofore, testing procedures and devices have produced results which have value for structural material intended to resist impact loads, but such known testing procedures and devices provide little or no information on how the yield point of the material, and other properties notably associated with fracture, may be permanently affected as a result of a process involving a high rate of strain. Conventional devices for measuring strain rates, such as those actuated by gravity augmented by springs, rubber bands, or the like; those actuated by compressed air; and mechanically actuated devices, are not able to achieve a strain rate of a high degree found to be desirable where the material being tested is to be used in making a member which may be subjected to a severe strain rate. One typical mechanically operated device utilizes a striker connected to a rotating flywheel and arranged to be triggered for striking a test specimen. Such a device is capable of imposing impact velocities and strain rates approaching those of the present invention, but only with the burdensome limitations of extreme weight, size, and expense. In contrast to such devices, the present device is small and inexpensive to manufacture as well as to operate.

Accordingly, it is an object of the present invention to provide a method and means for testing material under the conditions encountered in the use of explosive forming techniques.

It is another object of this invention to provide for dynamic testing of materials motivated by shock through waves from the detonation of an explosive charge.

It is a further object of the present invention to provide means for approximating the strain rates encountered in explosive forming techniques wherein the means are controlled and the results may be readily recorded.

By way of attaining these objects, the present invention comprises a novel method and device for performing tensile tests of material at high and controlled rates of strain. The method and device provide for uniaxial pre-straining at explosive strain rates. In the form of the invention shown and described herein, a controlled strain rate of the order of 200 inches per inches per second has been obtained, but even higher strain rates may be obtainable by using a heavier device than that employed in conducting the testing procedures herein described.

Other objects and many of the attendant advantages of this invention will be readily appreciated as the same become better understood by reference to the following detailed description when considered in connection with the accompanying drawings wherein.

Figure 1:
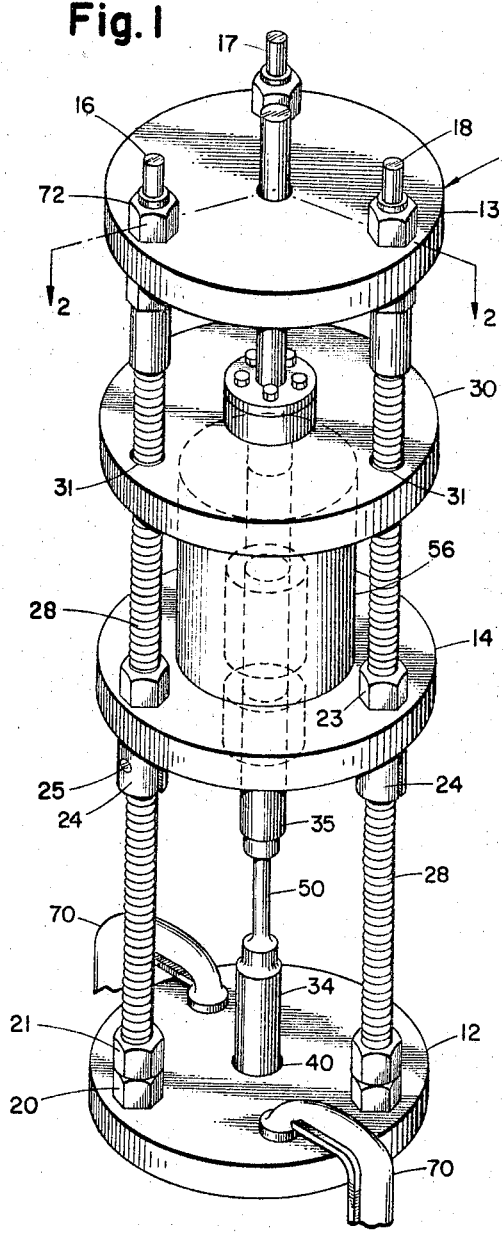
FIGURE 1 is an isometric view of a device for testing a specimen at high rates of tensile strain in accordance with the present invention.
Figure 2:
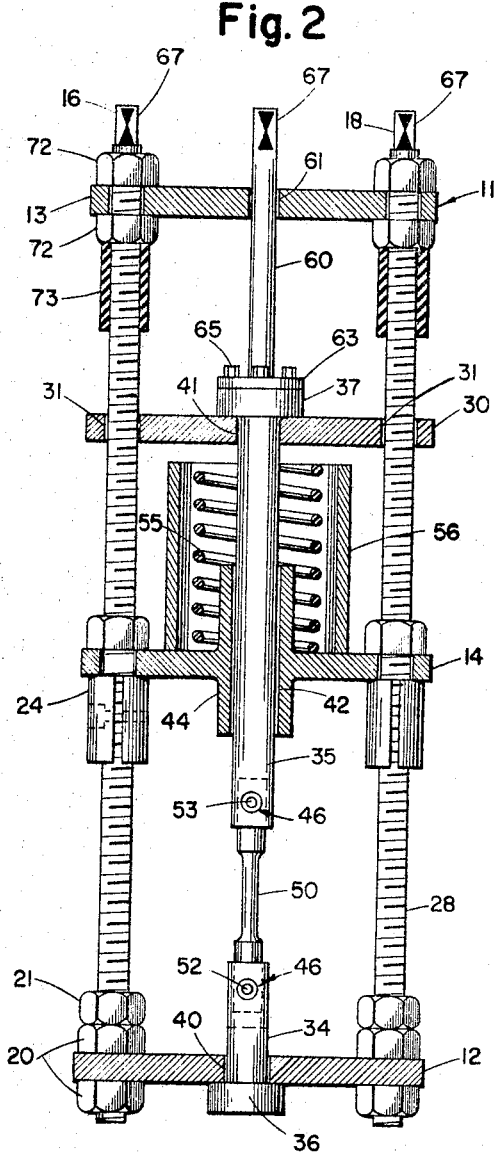
FIGURE 2 is a vertical longitudinal sectional view taken along the line 2—2 in FIGURE 1.

In FIGURE 1, the test device is generally indicated by supporting frame reference numeral 11 and comprises a supporting frame which includes spaced horizontal support members in the form of circular plates 12, 13 and 14 connected to one another by a plurality of elongate connector members, such as columns 16, 17 and 18, extending transversely to the circular support plates 12, 13 and 14. Only the upper portion of column 17 is illustrated in FIGURES 1 and 2 for purposes of clarity. The upper and lower circular support plates 13 and 12 are suitably secured to the columns 16, 17 and 18 by fastener means, such as nuts 20 and lock nuts 21. Intermediate support plate 14 is also secured to the columns 16, 17 and 18 in the desired position by suitable fastener means, such as nuts 23 and 24, the intermediate support plate 14 being held more securely than support plates 12 and 13 by nuts 24, each of which comprises a segmental sleeve nut. The two segments of the segmental sleeve nut 24 are held tightly together and clamped on their respective screw thread by means of tap screws 25. The intermediate support plate 14 is held more strongly on its lower surface by the segmental sleeve nuts 24, since the nuts 24 immediately below support plate 14 receive the full testing load upon detonation of an explosive charge. With the support plate 14 being positioned on the columns 16, 17 and 18 in an area where the columns 16, 17 and 18 are threaded, as indicated at 28, adjustment of the support plate 14 is permitted to accommodate the specimen to be tested.

Figure 3:
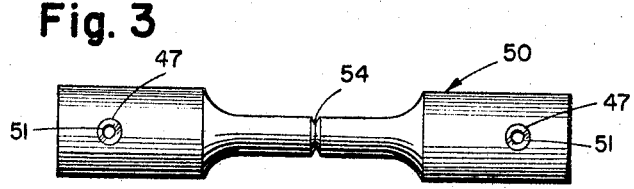
FIGURE 3 is an elevational view of a specimen to be tested by the device of FIGURE 1.

A movable horizontal member in the form of a circular driven plate 30 is positioned between support plates 13 and 14 and is provided with openings 31 for loosely receiving the columns 16, 17 and 18 so as to permit the driven plate 30 to slide freely up and down the columns 16, 17 and 18. Specimen holding means, such as pull rods 34 and 35, are positioned within the frame so as to extend longitudinally thereof and have enlarged heads 36 and 37 which abut against the distal surfaces of support plate 12 and driven plate 30, respectively. The pull rods 34, 35 extend through openings 40 and 41, respectively, in support plate 12 and driven plate 30. Pull rod 35 also passes through a bore 42 in a cylindrical guiding means or hub 44 which is integral with the intermediate support plate 14. In their proximal ends, pull rods 34 and 35 are provided with fittings 46 for receiving the respective end portions of a tensile test specimen 50. As shown in FIGURES 2 and 3, the end portions of the specimen 50 are provided with respective openings 47 to accommodate pins 52 and 53 which also pass through openings in pull rods 34 and 35 to secure the specimen 50 in place. It will be understood that the specimen 50 may be connected between the pull rods 34, 35 by suitable means other than that shown within the spirit of the present invention. Specimen 50 is shown in greater detail in FIGURE 3 and may be scored as indicated at 54 to cause deformation to occur at a desired cross-sectional area. Case hardened bushings 51 may be provided in the specimen 50 about the openings 47 therein so to insure rigid and secure attachment of the test specimen 50 between the pull rods 34, 35. The specimen 50 is axially aligned within the frame for reasons which will become apparent.

Shock wave producing means, such as an explosive charge 55, which may be in the form of a helix of Primacord, is positioned in axial encircling relationship about pull rod 35 so as to extend between support plate 14 and driven plate 30. The explosive charge 55 may also take other forms, such as a tubular cylinder or rings, which are co-axial with the frame, or may comprise a plurality of prismatic bodies, such as rods, strips, etc., arranged in a symmetrical pattern about the axis of the frame. The configuration of the explosive charge 55 should, however, be symmetrical with the axis of the frame and should provide an empty space around the axis sufficient to accommodate hub 44 of the support plate 14. The explosive charge 55 may be detonated by any suitable means, such as electrically actuated squibs, not shown. An axially elongated shaft 60 is attached to the enlarged head 37 of the pull rod 35 and extends upwardly, the shaft 60 being loosely received through an opening 61 in the upper support plate 13. A force retaining means in the form of a cylinder 56 is disposed radially outwardly of the explosive charge 55 and is mounted at one end on the intermediate support plate 14. The cylinder 56 serves to protect the columns 16, 17 and 18 against the effects of the shock wave or pressure wave resulting from the detonation of the explosive charge 55. The cylinder 56 may deform plastically upon each firing of an explosive charge and therefore may require frequent replacement. The pull rod 35 may be connected to shaft 60 in any suitable manner, such as by securing a radial flange 63 on shaft 60 to the enlarged head 37 of pull rod 35 by bolts 65.

To reduce the inertia of the moving portion of the testing device to as low a value as possible, the shaft 60 should preferably be formed as a tube made of a light metal, such as aluminum or magnesium. Relative movement indicating means are positioned in the upper end of shaft 60, as well as in the upper ends of columns 16, 17 and 18, such as target insignia 67, for indicating movement between the movable and stationary members of the device. The insignia 67 comprise geometrical figures which are formed so as to provide a distinct image for viewing or recording on film the motion imparted to the structure on which they are placed from the detonation of explosive charge 55.

When operated, the present device is preferably partly submerged in a suitable liquid medium, such as water, so as to provide a pressure transmission medium, the liquid extending up to the level of driven plate 30. Having the device submerged to this point keeps the upper surface of driven plate 30 dry and also presents no liquid resistance against upward motion of the driven plate 30 upon detonation of the explosive charge 55. The device is initially secured to a platform or a solid base by any suitable means, such as clamps 70.

Upon detonating the explosive charge 55, the driven plate 30 is driven upward with a force determined by the geometry of the explosive charge 55. The force imparts a high initial velocity to the driven plate 30 which is transmitted through pull rod 35 to pin 53 and then to the specimen 50. The reaction force on support plate 14 is transmitted through the segmental sleeve nuts 24, columns 16, 17 and 18, lower support plate 12 and pull rod 34 to the lower end of the specimen 50. Thus, the specimen 50 is loaded in tension at a high rate of strain, the amount of loading, the rate of loading, the strain rate and the strain being regulated by proper dimensioning of the explosive charge 55. The specimen 50 may be pulled to fracture or to a multiplicity of strains short of fracture. In order to set the device for a predetermined strain, stop members, such as nuts 72, may be provided about the upper end of each of the columns 16, 17 and 18 beneath the lower surface of the upper support plate 13. These stop members 72 may be adjusted along the columns 16, 17 and 18 to arrest the motion of the driven plate 30 to provide for a selected strain rate.

When the specimen 50 is pulled to fracture, driven plate 30 and shaft 60 continue to be moved upwardly at a high velocity. To stop this motion and prevent damage to the device, buffers 73 are positioned in a suitable manner below the upper support plate 13, such as by being disposed about the columns 16, 17 and 18 and below the stop members 72. These buffers 73 may be of resilient material or of other compressible material.

If it is desired to record the relative motion between the movable and fixed members of the device, any high speed recording device, such as one using the cinematographic technique, may be employed for this purpose. The insignia 67 as shown in the drawings is especially suited to this technique. The recording device selected should, however, be operative within the range of speed and distance of travel of the movable member of the device.

It will be recognized that many modifications and variations of the present invention are possible in the light of the above teachings. It is therefore to be understood that within the scope of the appended claims the invention may be practiced otherwise than as specifically described.

I claim:

1. A device for testing materials under conditions encountered in explosive forming comprising frame means for securely holding an elongated specimen to be tested, said frame means having movable and stationary members, means for securing one end of the specimen to a movable member and the other end of the specimen to a stationary member to symmetrically dispose the specimen with respect to said frame means, explosive means axially disposed in said frame means intermediate said movable and stationary members, and shield means substantially surrounding said explosive means so that upon detonation of said explosive means, said movable member will be moved away from said stationary member to subject the test specimen to a selected strain rate.

2. A device for testing materials under conditions encountered in explosive forming comprising a frame having a plurality of parallel columns, upper, lower and intermediate support plates disposed on and transverse to said columns, said support plates adjustably fixed to said columns and symmetrically disposed with respect thereto, a movable support plate positioned between the intermediate support plate and the upper support plate, upper specimen holding means abutting the upper surface of said movable support plate and extending axially downward therethrough, lower specimen holding means abutting the lower surface of the lower support plate and extending axially upward therethrough, means for attaching a test specimen to said upper and lower specimen holding means so that the test specimen is fixedly positioned intermediate the lower support plate and the intermediate support plate, explosive means axially positioned about said upper specimen holding means intermediate said movable support plate and said intermediate support plate, means radially confining said explosive means, restraining means fixedly holding the lower support plate, and means for detonating said explosive means so that upon detonation the movable support plate will be driven toward the upper support plate whereby the upper specimen holding means will be displaced relative to the lower specimen holding member extending the test specimen at a strain rate determined by the explosive force of the explosive means.

3. The device claimed in claim 2 wherein said explosive means is the form of a helix.

4. The device claimed in claim 3 wherein said means radially confining said explosive means comprises shield means substantially surrounding said helix to protect said frame.

5. The device claimed in claim 2 and extending means attached to the upper portion of said upper specimen holding means and movably extending through an axial opening in said upper support plate, and indicating means disposed on said columns at the top end thereof and on said extending means, said indicating means being in registry before detonation of said explosive means and at varying distances out of registry at selected times after detonation.

6. The device claimed in claim 2 and stopping means adjustably positioned on said columns intermediate said upper support plate and said movable support plate for providing a selected elongation of said test specimen.

7. The device claimed in claim 6 wherein said stopping means are spaced from said movable support plate to provide for fracture of said specimen before arresting the motion of said movable support plate.

References Cited by the Examiner

UNITED STATES PATENTS

| 463,259 | 11/1891 | Estrada | 73—12 |
| 2,900,818 | 8/1959 | Staar | 73—95 |
| 3,036,373 | 5/1962 | Drexelius | 72—56 |

OTHER REFERENCES

Response of Metals to High Velocity Deformation Metallurgical Society Conferences, volume 9, N.Y. Interscience Publishers, 1961 article by Dieter, pp. 414–416. article by Drafft, p. 44.

RICHARD C. QUEISSER, *Primary Examiner.*

G. M. GRON, J. J. SMITH, *Assistant Examiners.*